(12) United States Patent
Peace et al.

(10) Patent No.: US 6,250,167 B1
(45) Date of Patent: Jun. 26, 2001

(54) REMOVABLE RADIO FREQUENCY SENSOR ASSEMBLY FOR A TURBINE FLOW METER

(75) Inventors: Daniel W. Peace, Punxsutawney; Lewis C. Ometz; Gary P. Corpron, both of Dubois, all of PA (US)

(73) Assignee: M & FC Holding Company, Wilmington, DE (US)

(*) Notice: Subject to any disclaimer, the term of this patent is extended or adjusted under 35 U.S.C. 154(b) by 0 days.

(21) Appl. No.: 09/144,160

(22) Filed: Aug. 31, 1998

(51) Int. Cl.$^7$ .................................................. G01F 15/00
(52) U.S. Cl. ............................................................. 73/861.77
(58) Field of Search ............................ 73/861.77, 861.78, 73/861.79

(56) References Cited

U.S. PATENT DOCUMENTS

| | | | |
|---|---|---|---|
| 2,299,406 | 10/1942 | Potter | 73/231 |
| 2,436,683 | 2/1948 | Wood | 290/52 |
| 2,983,907 | * 5/1961 | Scourtes | 73/861.77 |
| 2,988,916 | * 6/1961 | Wauah | 73/861.77 |
| 3,101,615 | 8/1963 | Pavone | 73/231 |
| 3,166,936 | * 1/1965 | Fisher et al. | 73/861.77 |
| 3,217,539 | * 11/1965 | Owen et al. | 73/861.77 |
| 3,301,053 | * 1/1967 | Walch, Jr. et al. | 73/861.78 |
| 3,364,743 | * 1/1968 | Clinton | 73/861.77 |
| 3,636,767 | * 1/1972 | Duffy | 73/861.77 |
| 3,878,718 | 4/1975 | Sugiyama et al. | 73/861 R |
| 3,880,003 | * 4/1975 | Jamenson | 73/861.77 |
| 3,981,194 | * 9/1976 | Blise et al. | 73/861.78 |
| 4,164,866 | 8/1979 | Mitchell et al. | 73/231 R |
| 4,333,354 | 6/1982 | Feller | 73/861.77 |
| 4,537,081 | 8/1985 | Max | 73/861.77 |
| 4,825,707 | 5/1989 | Rosaen | 73/861.77 |
| 4,885,943 | 12/1989 | Tootell et al. | 73/861.77 |
| 4,936,151 | * 6/1990 | Tokio | 73/861.77 |
| 5,247,837 | 9/1993 | Corpron | 73/861.12 |
| 5,381,698 | * 1/1995 | Wiley | 73/861.77 |
| 5,392,657 | 2/1995 | Feller | 73/861.77 |

* cited by examiner

Primary Examiner—Benjamin R. Fuller
Assistant Examiner—Jag-Dish Patel
(74) Attorney, Agent, or Firm—Thompson Hine LLP (57) ABSTRACT

A sensor assembly for a fluid flow meter, more particularly a gas meter, includes a sensor well made of a non-magnetic material and a sensor which is removable from the well without depressurizing the fluid line in which the flow meter is located. The sensor well is mounted within a bore formed in a meter body boss and, in a preferred embodiment, extends through the internal rotor housing and includes an inner face contoured to conform to the inner wall of the housing. In certain embodiments of the invention, the sensor is shaped to cover the sensor well mounting bolts so that the well cannot be removed without first removing the sensor. In other embodiments, the sensor well mounting bolts are retained in the sensor well by dowel pins, stakes or retaining rings such that the bolts must be gradually and sequentially loosened to remove the sensor well, in order to prevent improper removal of the sensor well from the meter body boss. In still other embodiments, the sensor well is threaded directly into the body boss or includes a threaded collar and a sleeve which is rotatable to facilitate positioning of a contoured face relative to the housing inner wall. In such embodiments the body boss includes an annular recess which allows pressurized fluid to escape from between the sensor well and body boss as the sensor well is removed, thereby providing an audible warning that the line on which the meter is mounted is pressurized.

27 Claims, 7 Drawing Sheets

REMOVABLE RADIO FREQUENCY SENSOR ASSEMBLY FOR A TURBINE FLOW METER

BACKGROUND

The present invention relates to fluid flow meters for measuring the rate of fluid flowing through a pipe or conduit, and more particularly, to gas utility meters utilizing a vaned rotor and a non-contacting sensor.

Flow meters of a type commonly used as commercial utility meters include a housing enclosing a vaned rotor mounted on an axle connected to a tachometer. Fluid flow through the meter causes the rotor to rotate at a speed proportional to the flow rate. The tachometer generates a signal proportional to the rotor speed to indicate volumetric flow rate of the fluid through the meter.

A disadvantage with such meters is that a certain amount of leakage occurs from the bore through which the axle extends from the meter body. While this leakage is minimized by packing the axle to seal the bore, this does not solve the problem completely. Furthermore, such packing adds to the cost of the meter, has a limited lifespan, and when it fails can contaminate the liquid or gas flowing through the meter. In addition, the packing may be less effective at relatively high fluid pressures.

In response to such problems, fluid flow meters have been developed which do not require a mechanical connection between the rotor and the tachometer and thus can be completely sealed within the housing. This can be accomplished either by fabricating the rotor blades from a magnetic or conductive material or by mounting a magnetic or conductive element on one or more of the blades of the rotor. A sensor is positioned outside the meter body which generates a signal or pulse in response to the vanes of the rotor passing through a magnetic or electric field produced by the sensor, and a corresponding fluid flow rate is determined from the rate of pulses generated. Typical systems of this type use vane-mounted magnets or aluminum vanes and a sensor which detects a change in magnetic flux caused by a passing vane. Other systems have been developed which use radio frequency sensors. Irrespective of the mechanism employed, pulses received from the sensor are processed to determine the volumetric flow rate. Specifically, the pulses are counted to determine the total volume that has passed through the meter.

While such non-contact systems for measuring fluid flow rate solved many problems encountered with the earlier, mechanically connected flow meters, these systems have disadvantages. Since the accuracy of such magnetic or radio frequency based flow meters depends upon the ability of the sensor to detect a passing rotor through a magnetic or RF field, the body of the flow meter is made of a material which does not alter or distort the field. Furthermore, these flow meters are often subjected to highly corrosive environments and must withstand fluid pressures of up to 1440 psig. In most cases, these requirements have been met by fabricating the meter bodies entirely from non-magnetic stainless steel or other non-magnetic material. However, the use of stainless steel or other materials for the entire meter body increase the material cost, as well as the cost of fabrication. Also, the use of some alternative non-magnetic materials react with the fluid that is being measured, and therefore have an undesirably short useful life.

Attempts have been made to avoid the use of non-magnetic bodies by using a sensor encased in a non-magnetic well. This well is installed in an opening through the body which can be made of less expensive magnetic material. A seal must be provided between the body and sensor. A problem encountered with such prior flow meters is that, should a sensor need to be removed from the housing for repair or replacement, it is necessary to depressurize the entire line where the meter is located, since the sensor module itself forms part of the meter body and its removal creates an opening. In most cases, this requires down time.

Accordingly, there is a need for a flow meter of the non-contacting type which can be made of a conventional, relatively inexpensive and robust material, but will not interfere with the magnetic field detected by the sensor, is corrosion resistant, can withstand high pressures, allows removal of the sensor without requiring depressurization of the fluid line, and can safely be removed without endangering service personnel.

SUMMARY OF THE INVENTION

The present invention is a sensor assembly for a sealed, rotor-type flow meter which is fabricated from a material which does not interfere with the signals produced by the rotor. While the preferred embodiments of the fluid flow meters of the present invention herein described are designed for a gas turbine flow meter, the usefulness of the invention in flow meters designed for water or other fluids or with rotors other than a turbine impeller will be understood to those skilled in the art.

The sensor assembly includes a sensor well received within the bore of a flow meter body boss, and a sensor fitted within a bore in the well. The well is generally cylindrical in shape and is shaped to extend through the cylindrical base, meter body and internal rotor housing. The meter housing is made of a ferromagnetic material. The well includes a face in close proximity to the rotor which is sufficiently thin to enable the sensor to detect the passing rotor vanes, but is strong enough to withstand internal gas pressures of up to 1440 psig. In a preferred embodiment, the face is shaped to fit the contour of the inner face of the internal rotor housing, thereby creating a smooth path for rotation of the rotor and enabling the sensor to be located as close as possible to the path of the rotor blades, thereby increasing the strength of the signal detected by the sensor. A sealing device, such as an O-ring, preferably is provided between the sensor well and the body boss to ensure a gas-tight seal.

The sensor well of the present invention can be attached to the meter body boss in a number of ways. In one embodiment, the sensor well is permanently attached to the body boss by a weld, braze or epoxy. Such a permanent attachment eliminates the need for a sealing O-ring. However, in some instances removal of the entire sensor well will be required. In these cases, even if the meter can be effectively bypassed without a shut down, it could be difficult to ensure that the line containing the meter has been completely depressurized and purged. Thus, the person performing such maintenance can be exposed to a dangerous release of pressurized gas when the meter body is disassembled.

This problem is overcome in another embodiment of the invention in which the sensor well is removably attached to the body boss by bolts. The bolts pass through bores in the sensor well and thread into the body boss. In a preferred embodiment, the bolts are countersunk into the well body and are retained therein during unthreading by a dowel pin. This requires all of the bolts to be unthreaded in unison by alternately and incrementally turning each bolt. In so doing, the O-ring seal will be broken prior to any of the bolts being removed. If present, gas sensor will begin escaping past the seal. The noise will warn the operator to stop removal of the well and to depressurize the line by accepted means, thereby preventing a blowout of the well by the internal sensor in the meter housing. Alternately, the retaining elements such as a retaining ring, or a swedged or staked-over lip may be used instead of dowel pins. A retaining ring or stop positioned on the lower part of the fastener near the body is also effective.

In an alternate embodiment, the sensor well is threaded into the body boss such that the partial removal of the well from a meter on a pressurized line causes an audible warning sound or visual spray, warning the operator of sensor in the line. This warning signal is caused by the seal moving away from its seat before the threads disengage completely from the boss.

The sensor can be retained in the sensor well in a number of suitable ways, so long as the sensor can easily be disconnected from the sensor well for repair or replacement. In a preferred embodiment, the sensor is threaded into the bore of the sensor well. In this embodiment, the head of the sensor is shaped to cover the top surface of the sensor well, thereby covering the heads of the mounting bolts, thus protecting the sensor from damage by preventing removal of the well without first removing the sensor.

Accordingly, it is an object of the present invention to provide a sensor assembly for a turbine-type fluid flow meter which does not interfere with the magnetic fields detected by the sensor; a sensor assembly which is corrosion resistant and capable of withstanding pressures of up to 1440 psig; a sensor assembly which allows for easy and safe removal of the sensor for repair and replacement without requiring depressurization of an associated line; and a sensor assembly which may be safely and easily removed from a fluid line.

Other objects and advantages of the present invention will be apparent from the following description, the accompanying drawings and the appended claims.

DETAILED DESCRIPTION

Figure 1:
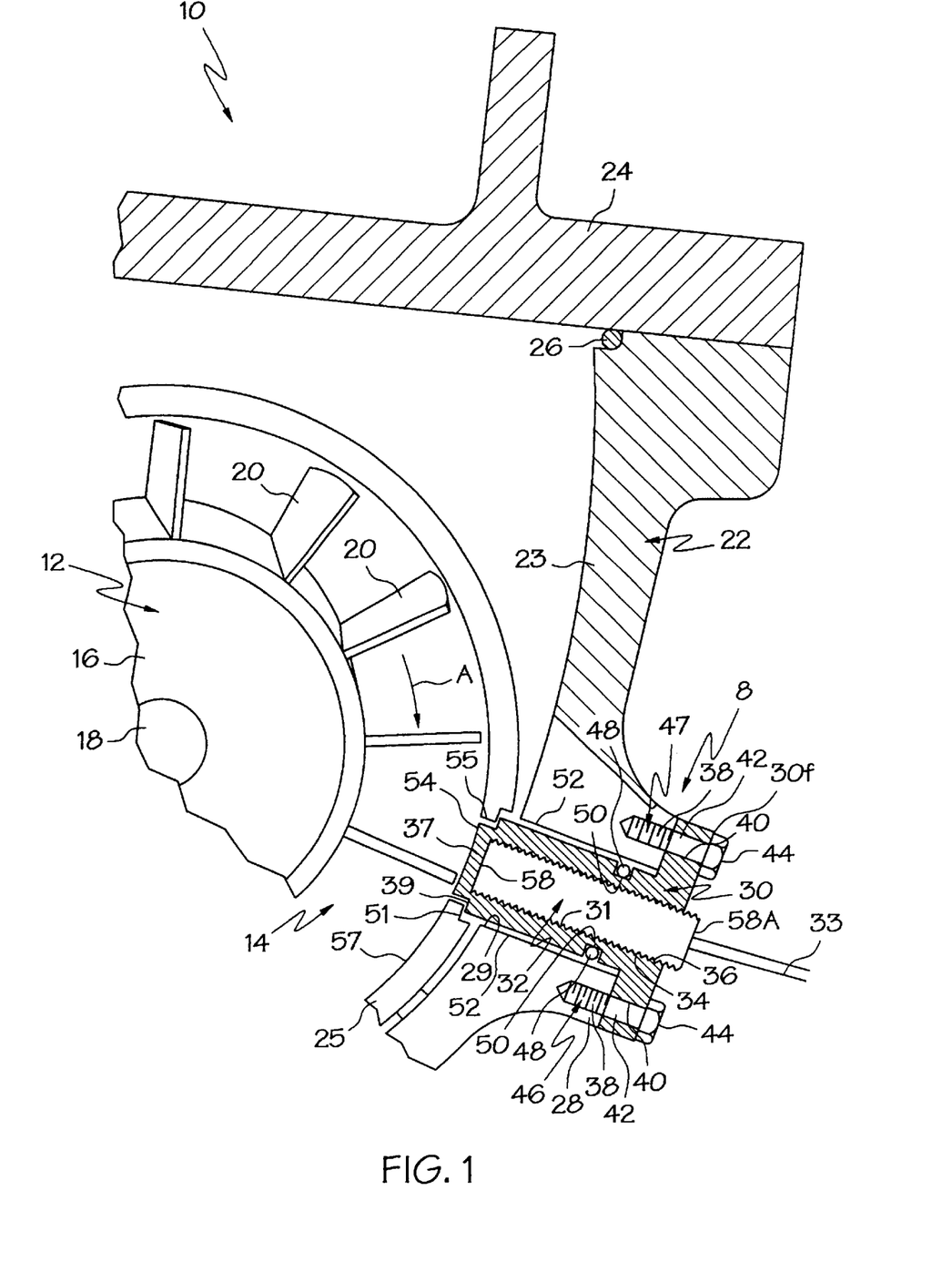
FIG. 1 is a side elevational view in section of a preferred embodiment of the sensor assembly for a fluid flow meter of the present invention.
Figure 2:
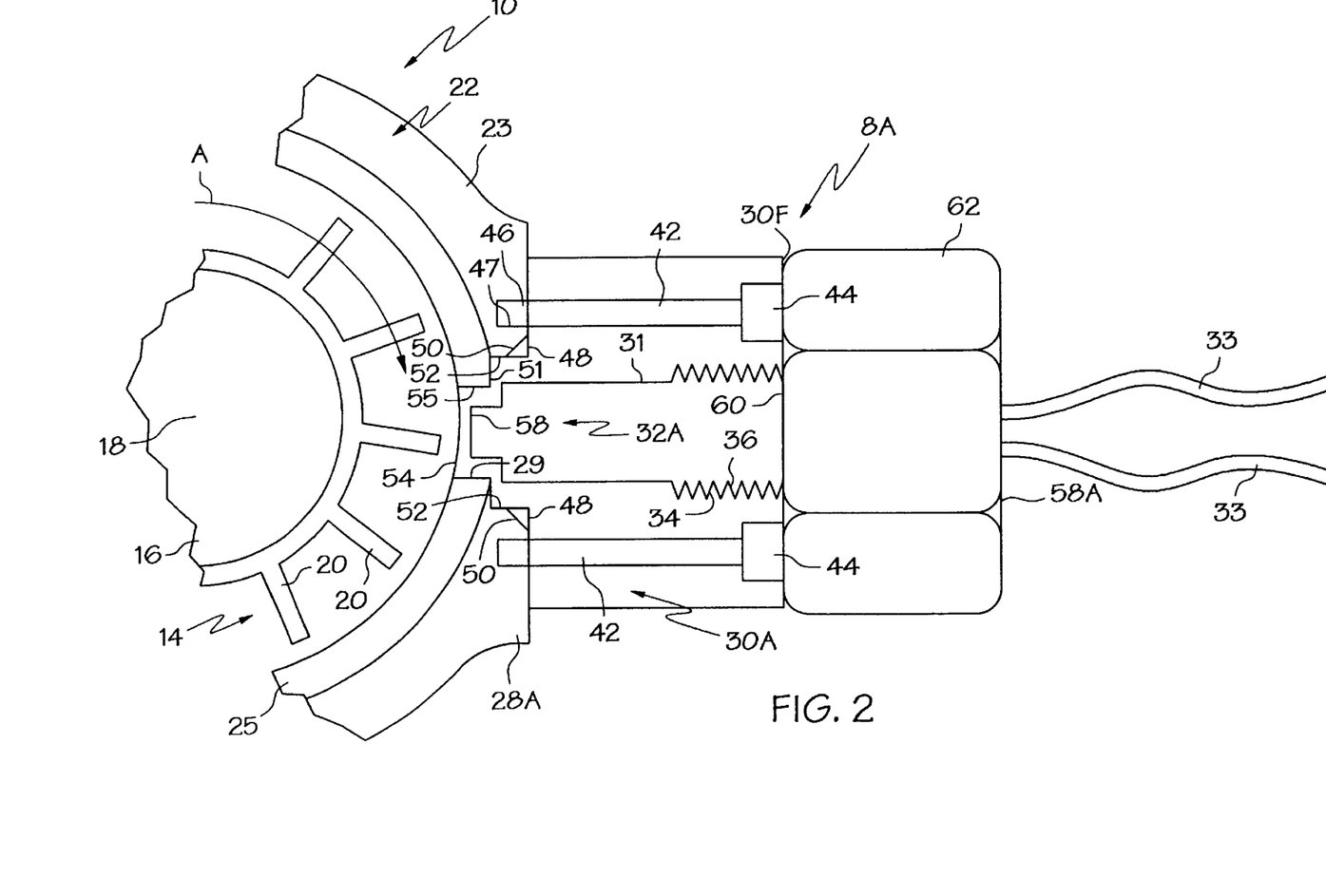
FIG. 2 is a side elevational view in section of an alternate embodiment of the sensor assembly of the present invention.
Figure 3:
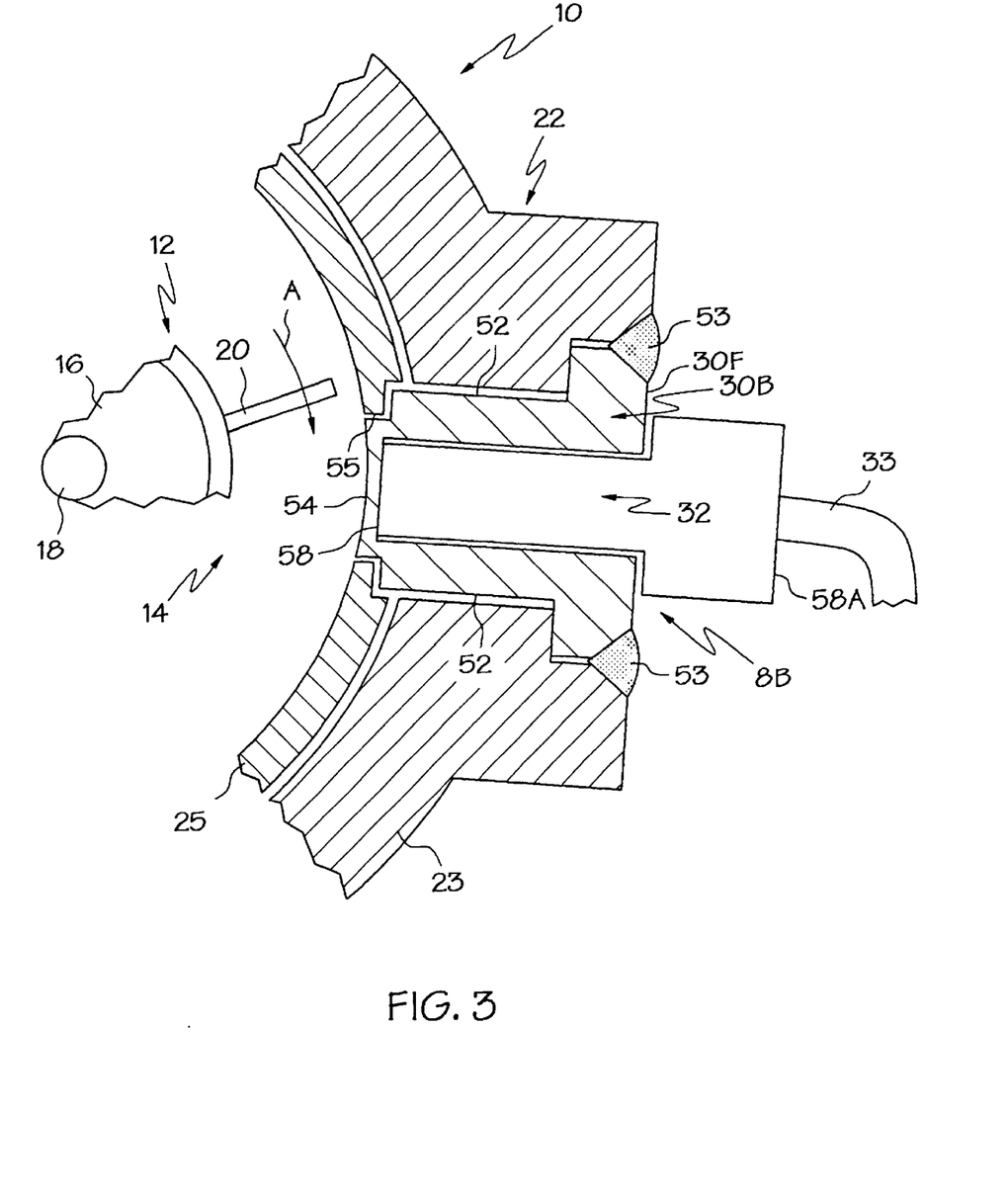
FIG. 3 is a side elevational view in section of a second alternate embodiment of the sensor assembly of the present invention.

As shown in FIGS. 1–3, a preferred embodiment of the sensor assembly of the present invention, generally designated 8, is mounted in a fluid flow meter, generally designated 10. The flow meter 10 includes a turbine rotor 12 rotatably mounted within a fluid line 14. The rotor 12 includes a hub 16, mounted on an axle 18, and blades 20 placed circumferentially around the hub. Preferably, the hub 18 and blades 20 are made of material such as stainless steel, aluminum, or other such electrically conductive material, or with similar such materials disposed in the blades. The fluid flow meter 10 has a body 22 which can be made of any suitable material, such as cast iron, cast steel, or aluminum, and includes an outer main body 23 and an inner rotor housing 25, the latter of which houses the rotor 12 and forms a segment of the fluid line 14. In the embodiment shown in FIG. 1, the outer main body 23 includes an access closure 24 which is secured to the remainder of the main body and includes a seal 26.

The fluid flow meter 10 includes a body boss 28 having a bore 29 shaped to receive a sensor well 30 the sensor well 30 having an outer end 30F. The bore 29 extends through the boss 28 and into the fluid line 14. The well 30 includes a bore 31 shaped to receive a sensor 32. The sensor 32 includes an inner end 58 disposed in close proximity to the rotor 12 when the sensor 32 is installed in the sensor well 30 and an outer end 58A. The sensor 32 is connected to a gauge or similar output indicator (not shown) by leads 33. Preferably, the sensor well 30 is made of a non-ferromagnetic material such as stainless steel, although any material which does not interfere with the magnetic or radio frequency field variations detected by the sensor as a result of the rotor motion is acceptable. The interior surface of the sensor well 30 and exterior surface of the sensor 32 each include threads 34, 36 respectively, so that the sensor 32 threads into the sensor well 30. While the sensor 32 is retained in the sensor well 30 by threads in a preferred embodiment, one of ordinary skill in the art would realize that the sensor 32 could be retained in the sensor well 30 in any number of ways including, for example, by retaining clips, by a retaining bracket held in place by a screw, or by a resiliently biased locking mechanism, just to name a few. All of these embodiments could be effective and are considered within the scope of the present invention.

The well 30 includes a relatively thin bottom wall 37 (preferably about 0.040 inches thick for a stainless steel well) which protrudes through the inner rotor housing 25, through bore 55. The face 54 of the sensor well 30 is shaped to match the contour of the inner face 57 of housing 25. The counterbore 51 in the rotor housing 25 provides a locating surface for the shoulder 39 on the sensor well 30. This positions the contoured face 54 flush with the inner face 57 of housing 25.

The body boss 28 contains the threaded bores 38 which align with smooth bores 40 extending through the sensor well 30. Fasteners such as threaded bolts 42 are inserted through the bores 40 and include heads 44 and threads 46 which engage the threads 47, thereby securing the sensor well 30 to the outer main body 23. An O-ring 48, preferably made of an elastomeric material, is seated in a channel 50 provided on the sensor well 30. Preferably, the O-ring 48 protrudes from the channel 50 so that when the sensor well 30 is secured into the outer main body 23, the O-ring 48 contacts the interior walls 52 of the body boss 28, sealing the fluid line 14 from the ambient environment.

As shown in FIG. 2, in an alternate embodiment 8A, the inner wall 52 of the body boss 28A has a channel 50 to receive O-ring 48, which forms a seal between the body boss 28A and the sensor well 30A. In the embodiment 8B shown in FIG. 3, the sensor well 30B is permanently secured to the outer main body 23 by a braze or weld 53 which acts to seal the fluid line 14 from the atmosphere, thereby eliminating the need for an O-ring.

As shown in FIGS. 1, 2, and 3, a bore 55 is formed through the inner rotor housing 25 to allow the face 54 to protrude directly into the fluid line 14. In these embodiments, the face 54 of the sensor well 30 is contoured to align with the inner rotor housing 25 thereby creating a smooth passageway for the fluid and avoiding interference with the path A of the rotor blades 20.

As shown in FIG. 2, the sensor assembly 8A includes a sensor 32A having an inner end 58 and an enlarged head 60 in the shape of a hex nut 62 which allows the sensor 32A to be tightened into the sensor well 30A more easily. The nut 62 is sized such that it covers the fastener heads 44 when tightened against the sensor well 30A, preventing access to the bolts 42. This prevents the removal of the sensor well 30A from the outer main body 23 without first removing the sensor 32A.

Figure 4A:
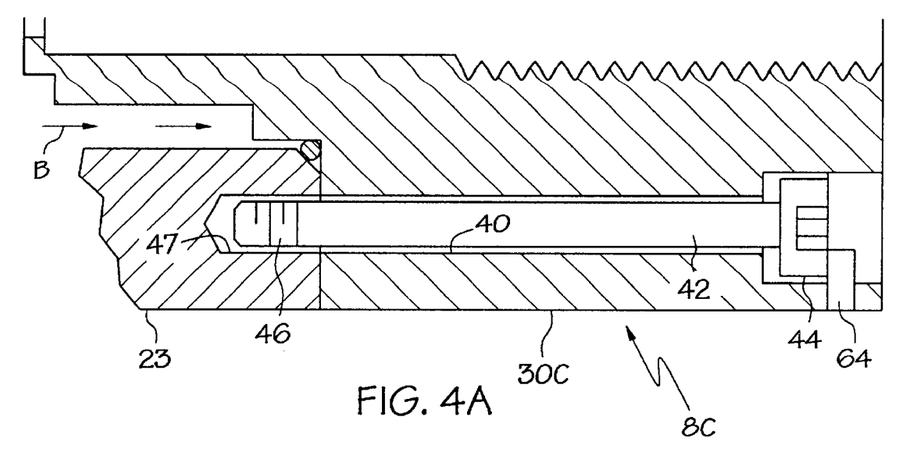
FIGS. 4A and B are detail side elevational views in section of a fastener arrangement in operation for a third alternate embodiment of the sensor assembly of the present invention.
Figure 4B:
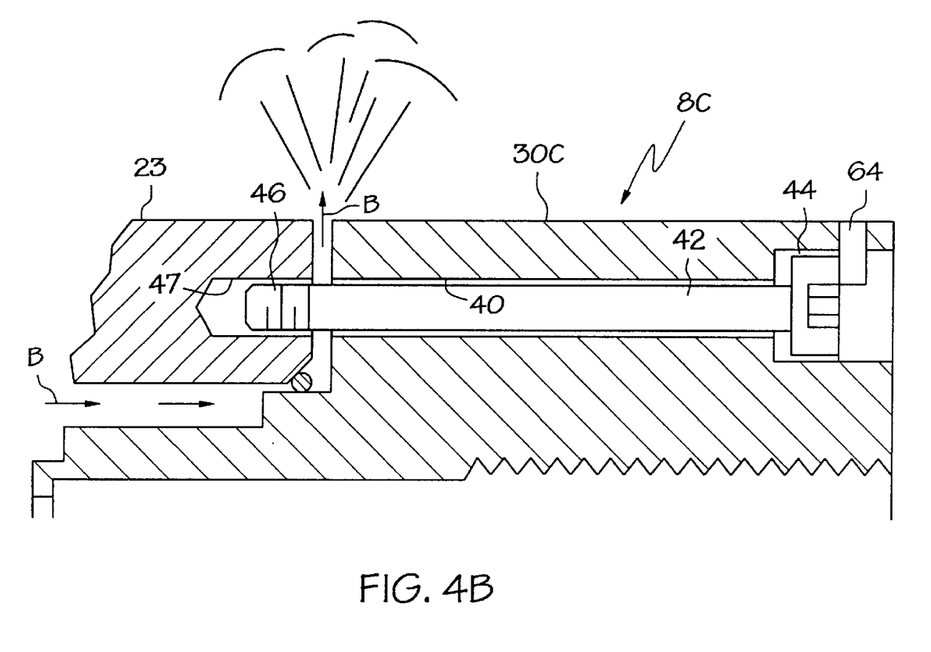

A safety feature included in the sensor assembly 8C, shown in FIGS. 4A and 4B, prevents accidental blowout of the sensor well 30C due to fluid sensor remaining in the fluid-line, as depicted by arrow B, during removal of the sensor well 30C for maintenance. Stops 64 are provided over the heads 44 of the fasteners 42, capturing the fasteners so that they all must be removed in unison by alternately and incrementally loosening each fastener. If after the fasteners 42 have been loosened a sufficient amount, the line is still pressurized, fluid, as depicted by arrow B, will be released to the atmosphere, creating an audible or visual warning of the residual sensor. Preferably, this leakage will occur while the fastener threads 46 are still engaged with at least three of the body threads 47, thus providing the warning while the sensor well 30C is still safely connected to the outer main body 23.

Figure 5A:
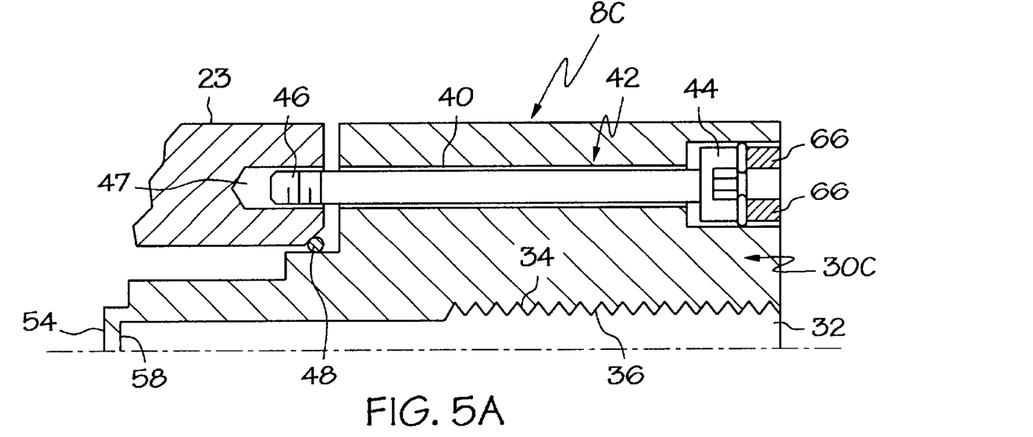
FIGS. 5A, B, and C are detail side elevational views in section of fastener arrangements for alternate embodiments of the sensor assembly of the present invention.
Figure 5B:
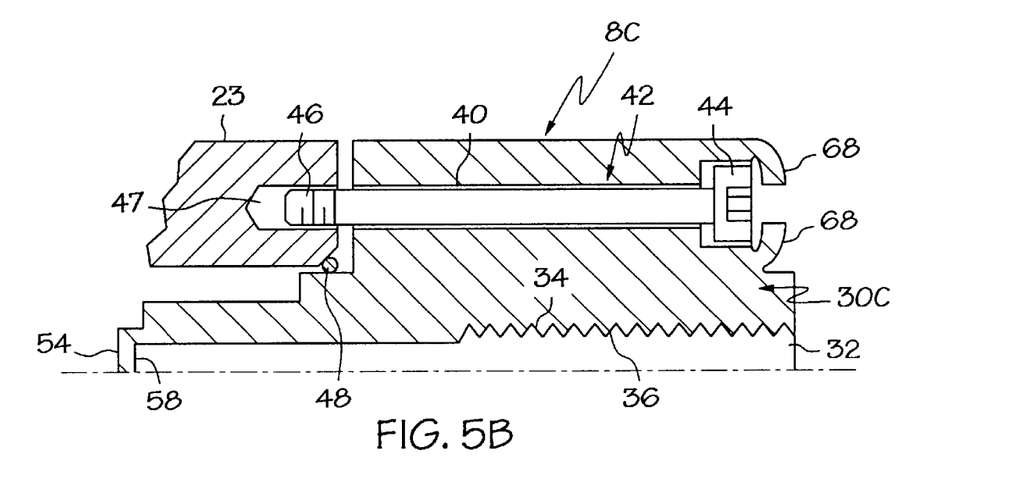
Figure 5C:
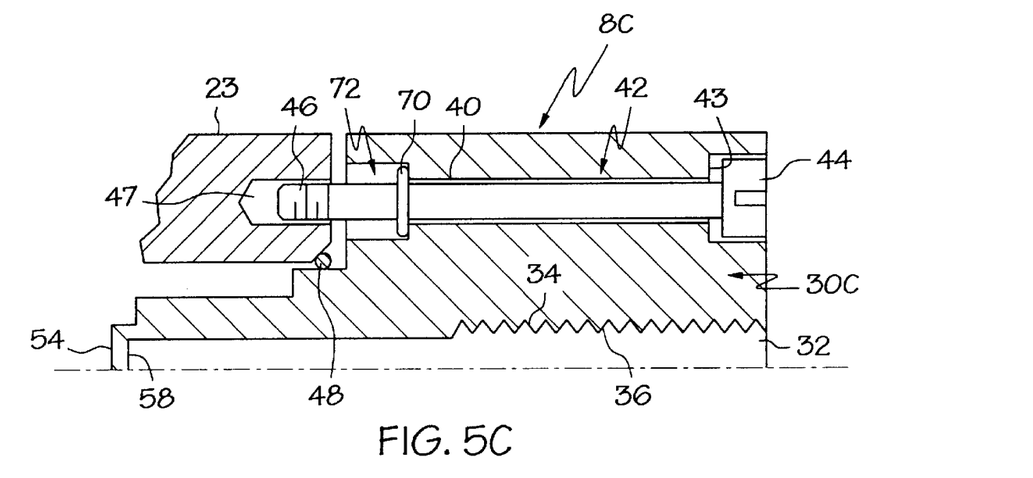

Incorporation of the above-mentioned safety feature can take many forms, so long as the fasteners 42 are captured after they are released from the body threads 47. For illustrative purposes, several preferred methods of incorporating this feature are shown in FIGS. 5A, 5B, and 5C for assembly 8C. As shown in FIG. 5A, a pressed-in, or alternately, threaded-in, ring 66 is placed over the head 44 of the fastener 42 to capture the fastener when it is loosened from the body threads 47. This prevents the removal of the fastener 42 from bore 40. In the embodiment 8C shown in FIG. 5B, a portion of the sensor well 30C is swedged or staked over the head of the fastener 44, creating a lip 68 which captures the fastener 42 and prevents its removal from bore 40. And in the embodiment 8C shown in FIG. 5C, a retaining ring 70 is mounted on the lower part of the fastener 42 which prevents the fastener 42 from being removed from the well 30. In this embodiment, the well 30 contains a retaining ring bore 72 which allows clearance for the retaining ring 70 when the head of the fastener 44 is tightened against its seat 43.

Figure 6A:
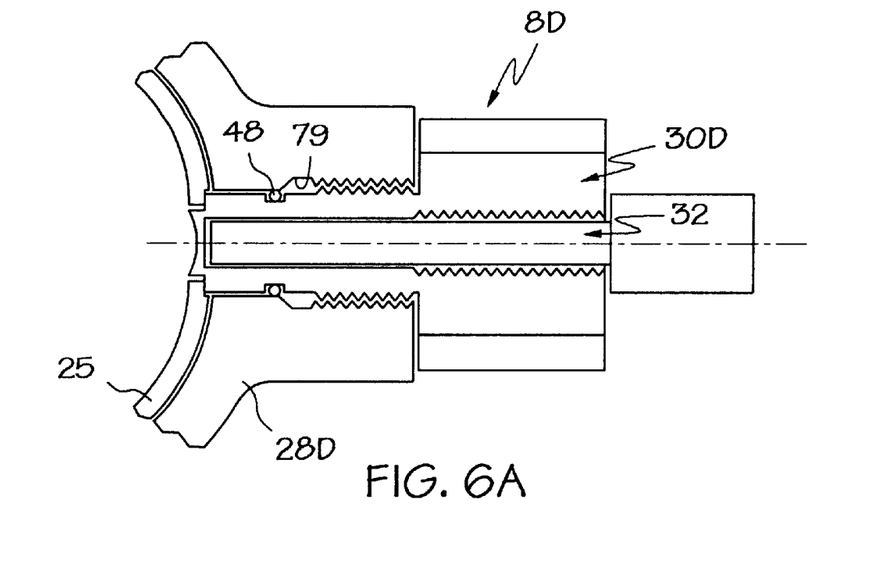
FIGS. 6A and 6B are detail side elevational views in section of a fourth alternate embodiment of the sensor assembly of the present invention.
Figure 6B:
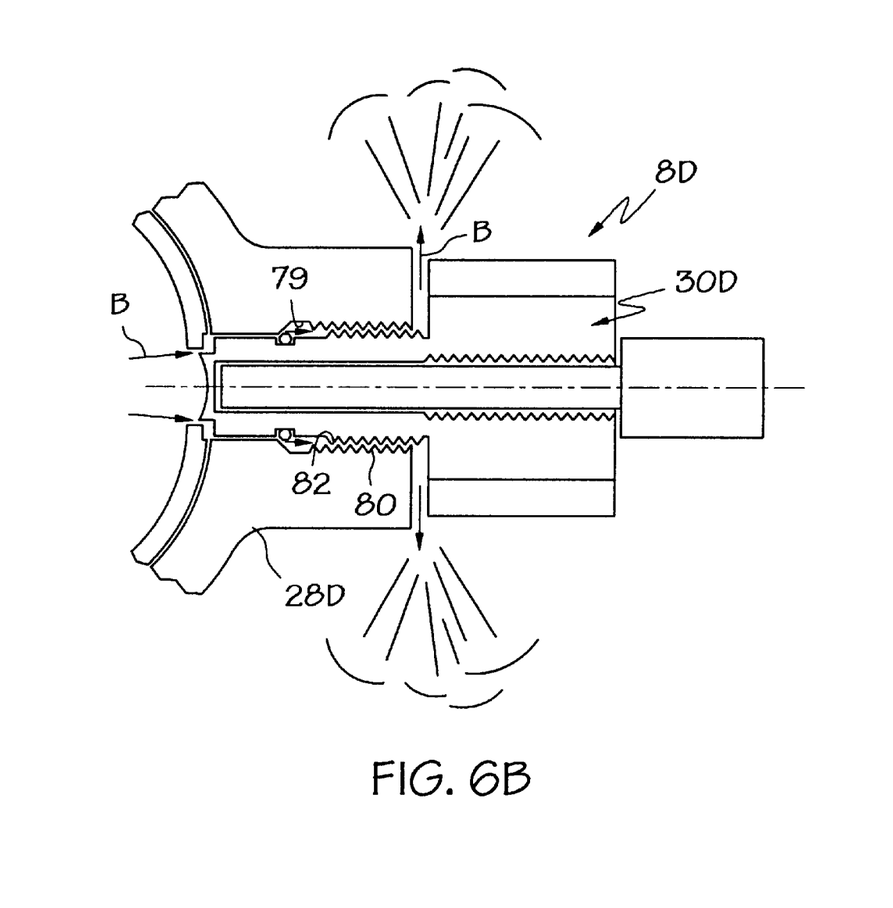

Another embodiment of the sensor assembly 8D is shown in FIGS. 6A and 6B. The sensor well 30D is threaded into the body boss 28D, which includes an annular sensor relief grove 79. The O-ring seal 48 is positioned so that a few turns of the sensor well 30D will displace the sensor well relative to the body boss 28D, allowing the O-ring seal 48 to enter recess 79 and unseat the seal while still maintaining a safe thread engagement between the sensor well threads 82 and the body boss threads 80. A visual and/or audible warning by the escaping fluid B from between the body boss 28D and the sensor well 30D will signal that sensor is still in the lines and alert a user to stop the removal of the sensor well.

Figure 7:
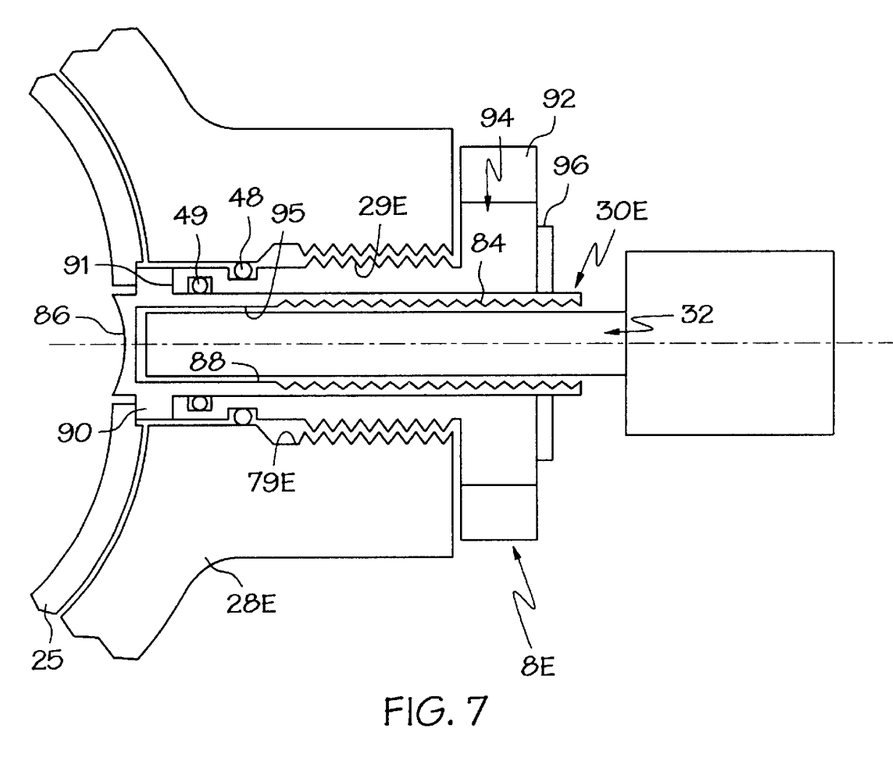
FIG. 7 is a detail side elevational view in section of a fifth alternate embodiment of the sensor assembly of the present invention.

As shown in FIG. 7, sensor assembly 8E includes a sensor well 30E made up of a sleeve 84 having a contoured face 86, shaped to conform to the curvature of the inner surface of the internal housing 25, and an internal channel 88 shaped to receive the sensor 32 in a threaded connection. The sleeve 84 preferably is made of a non-ferromagnetic material. The sleeve 84 includes a raised, annular rib 90 adjacent to the contoured face 86. A threaded holding collar 92, having a hex head 94, is threaded into a bore 29E, which has an annular recess 79E. The holding collar 92 preferably is made of a non-ferromagnetic material, but may be made of a ferromagnetic material without substantially interfering with the operation of the sensor 32. The holding collar 92 includes a central bore 95 which slidably and rotationally receives sleeve 84 therethrough. Holding collar 92 also includes O-ring seals 48, 49, positioned between the holding collar and the body boss 28E and between the holding collar and the sleeve 84, respectively. A jam nut 96 locks the sleeve 84 in position within the holding collar 92, so that the sleeve is fixed in position and clamped to the collar by engagement of the rib 90 with the end face of the collar and engagement of the jam nut with the top surface of the hex head, thereby preventing relative rotational movement between the sleeve and collar.

The operation of the sensor assembly 8E is as follows. To mount the sensor assembly 8E in a body boss 28E, the collar 92 first is inserted over the sleeve 84 until the end 91 of the collar abuts the rib 90 (at this time the sensor 32 is not inserted in the sleeve). The combined collar 92 and sleeve 84 are threaded into the bore 29E by twisting the hex head 94 of the collar 92. The sleeve 84 is then rotated relative to the collar 92 until the contoured face 86 conforms to the curvature of the inner surface of the internal housing 25. Once the contoured face 86 is properly aligned, the jam nut 96 is tightened down on the hex head 94 to draw the rib 90 against the end face of the collar and lock the sleeve 84 in position, and the sensor 32 is threaded into place in the internal channel 88. Accordingly, it is an advantage of this embodiment that proper orientation of the contoured face 86 is accomplished without need to adjust the collar 92, or to cut threads on the collar and body boss with high precision to ensure proper alignment of the contoured face of the sensor well.

In addition, backing out the collar 92 from the body boss displaces the O-ring seal 48 relative to the body boss until it reaches annular sensor groove 79E. The O-ring seal 48 cannot maintain a seal in the enlarged space created by the groove 79E and therefore allows pressurized fluid from within the line to escape along the threads of the bore 29E and the body boss 28E, creating an audible warning of the pressurized state of the line. However, at this point, the threads of the collar still engage the corresponding threads of the body boss 28E, so that the escaping pressurized fluid which creates the audible warning signal cannot also propel the collar 92 and sensor well 30E from the body boss.

The operation of the sensor assembly 8 (FIG. 1) is as follows. The flow meter body 22, and in particular the internal rotor housing 25, of the fluid flow meter 10 of the present invention is connected to a fluid line 14. A pressurized gas flows through the line 14 impinging on the blades 20 of the rotor 12, causing the rotor to rotate about the axle 18. The sensor 32 is threaded into the sensor well 30 as close as possible to the path A of the rotor blades 20. Since the sensor well 30 is made from a non-magnetic material, such as stainless steel, the sensor 32 receives a clear signal from the rotation of the rotor 12. The magnetic fields of the sensor 32 are disturbed and the sensor detects the passage of each blade 20 of the rotor 12, and relays this information through cable 33 to an output indicator (not shown), where the desired output is generated, such as volume of gas, and is displayed.

Should the sensor 32 need to be removed from the flow meter 10 for maintenance, it is simply unscrewed from the sensor well threads 34. Since the bore 31 which receives the sensor 32 is sealed from the fluid line 14, and the sensor well is capable of safely withstanding pressures up to 1440 psig, this may be accomplished without depressurizing the fluid line 14.

Should the entire sensor well 30 need to be removed for maintenance, the fasteners 42 are unthreaded from their respective threaded bores 38 in the body boss 28. In a preferred embodiment, the fasteners contain a safety feature preventing removal of the sensor well 30 from the body boss 28 while the fluid line 14 is still pressurized. As shown in FIGS. 4A and B, this is accomplished by providing a stop 64 which retains the fasteners 42 in the bores 40 upon disengagement from the body threads 47. When the fasteners 42 are loosened a certain extent, gas or liquid, as shown by arrow B, which pressurizes the line 14, will escape from the fluid line 14 to the ambient, creating an audible and possibly visual warning that the line 14 is still pressurized. The escape of gas or liquid around the unseated seal may be visible if vapor droplets are formed or if the fluid is colorized. Also, an odor may be detected if the fluid is odorized. These warnings to stop ensure that the sensor well 30 is only removed when the fluid line 14 is safely depressurized, thereby avoiding dangerous blowouts.

While the forms of the apparatus herein described constitute preferred embodiments of the invention, it is to be understood that the invention is not limited to these precise forms of apparatus, and that changes may be made therein without departing from the scope of the invention.

What is claimed is:

1. A fluid flow meter comprising:
   a rotor including blades thereon said rotor not including permanent magnets positioned in or on said rotor or said blades;
   a sensor well made of a non-magnetic material, said sensor well forming a bore and including a closed inner end positioned in close proximity to said rotor; and
   a radio-frequency based sensor mounted within said bore, said sensor being removable from said bore without removing said sensor well and having an inner end positioned in close proximity to said inner end of said sensor well.

2. The fluid flow meter of claim 1 further including a fluid flow meter body having a body boss including a bore formed in said body boss wherein said sensor well is shaped to fit within said bore formed in said body boss of said flow meter body.

3. The fluid flow meter of claim 2 wherein said sensor well is releasably attached to said body boss.

4. The fluid flow meter of claim 2 further comprising a seal positioned between said sensor well and said body boss.

5. The fluid flow meter of claim 1 wherein said sensor well is made of stainless steel.

6. The fluid flow meter of claim 1 wherein said rotor and said blades are made entirely of aluminum or stainless steel.

7. A fluid flow meter comprising:
   rotor including blades thereon said rotor not including permanent magnets positioned in or on said rotor or said blades;
   a sensor well made of a non-magnetic material, said sensor well forming a bore and including a closed inner end;
   a fluid flow meter body having a body boss including a bore, wherein said sensor well being shaped to fit within said bore formed in said body boss, said sensor well being releasably attached to said body boss by bolts, said sensor well further including an inner face shaped to provide a smooth contour with said flow meter body such that said inner face of said sensor well is positioned a minimal distance from vane tips of said rotor;
   a gasket positioned between said sensor well and said body boss; and
   a radio frequency sensor mounted within said sensor well and having an inner end positioned in close proximity to said closed inner end of said sensor well, said sensor having an enlarged head having a hex shape to facilitate removal of said sensor from said sensor well and sized such that when said sensor is mounted in said sensor well said head covers, and thereby prevents access to, said bolts.

8. The fluid flow meter of claim 7 wherein said sensor well is made of stainless steel.

9. The fluid flow meter of claim 7 wherein said totor and said blades are made entirely of aluminum or stainless steel.

10. A fluid flow meter comprising:
    a flow meter body having a body boss including a bore;
    a rotor rotatably mounted within said flow meter body;
    a sensor assembly including a sensor well made of a non-magnetic material, said sensor well forming a bore and including a closed inner end and being shaped to fit within said bore of said body boss, said sensor well being releasably attached to said body boss; and
    a radio frequency sensor for sensing changes in radio frequency waves mounted in said flow meter body and within said sensor well.

11. The fluid flow meter of claim 10 wherein said sensor well is made of stainless steel.

12. A fluid flow meter comprising:
    a rotor including blades thereon said rotor not including permanent magnets positioned in or on said rotor or said blades;
    a flow meter body containing said rotor and having a body boss including a bore having an axis which intersects said rotor; and
    a sensor assembly including:
       a sensor well forming a bore and having a closed inner end disposed within said bore of said body boss and attached to said body boss; and
       a radio frequency detecting sensor disposed within said sensor well, having an inner end disposed in close proximity to said rotor, and removable from said sensor well from outside said flow meter body while said sensor well is attached to said body boss thereby maintaining fluid sensor within said flow meter body.

13. The fluid flow meter of claim 12, wherein said sensor well has an outer end, and wherein said sensor has an outer end which overlaps said outer end of said sensor well so that said sensor must be removed from said sensor well before said sensor well can be removed from said flow meter body.

14. The fluid flow meter of claim 12 wherein said rotor and said blades are made entirely of aluminum or stainless steel.

15. A fluid flow meter comprising:
    a rotor including blades thereon said rotor not including permanent magnets positioned in or on said rotor or said blades;
    a flow meter body containing said rotor and having a body boss including a bore having an axis which intersects said rotor; and a sensor assembly including:
- a sensor well forming a bore and having a closed inner end disposed within said bore of said body boss, said sensor well attached to said body boss, and removable from said body boss from outside said flow meter body while said body boss remains attached to said flow meter body; and
- a radio frequency detecting sensor disposed within said sensor well and having an inner end disposed in close proximity to said rotor.

16. The fluid flow meter of claim 15 wherein said sensor is attached to said sensor well and is removable from said sensor well from outside said flow meter body while said sensor well is attached to said body boss thereby maintaining fluid sensor within said flow meter body.

17. The fluid flow meter of claim 16 wherein said sensor well has an outer end, and wherein said sensor has an outer end which overlaps said outer end of said sensor well so that said sensor must be removed from said sensor well before said sensor well can be removed from said body boss.

18. The fluid flow meter of claim 15 wherein said body boss has a threaded bore, wherein said sensor well has a smooth bore aligned with said threaded bore, wherein said sensor assembly also includes a bolt having a threaded shaft which is disposed in said smooth bore and which is engaged in said threaded bore, wherein said sensor is threadably attached to said sensor well, and wherein said sensor has an outer end which covers said bolt.

19. The fluid flow meter of claim 15 wherein said rotor and said blades are made entirely of aluminum or stainless steel.

20. A fluid flow meter comprising:
- a rotor including blades thereon said rotor not including permanent magnets positioned in or on said rotor or said blades;
- a flow meter body containing said rotor and a body boss having a bore having an axis which intersects said rotor;
- a sensor well forming a bore and having a closed inner end disposed within said bore of said body boss, said sensor well attached to said body boss; and
- a radio frequency detecting sensor disposed within said sensor well, having an inner end disposed in close proximity to said rotor, and removable from said sensor well from outside said flow meter body while said sensor well is attached to said body boss thereby maintaining fluid sensor within said flow meter body.

21. The fluid flow meter of claim 20, wherein said sensor well has an outer end, and wherein said sensor has an outer end which overlaps said outer end of said sensor well so that said sensor must be removed from said sensor well before said sensor well can be removed from said body boss.

22. The fluid flow meter of claim 20 wherein said rotor and said blades are made entirely of aluminum or stainless steel.

23. A fluid flow meter comprising:
- a rotor including blades thereon said rotor not including permanent magnets positioned in or on said rotor or said blades;
- a flow meter body containing said rotor having a body boss including a bore having an axis which intersects said rotor;
- a sensor well forming a bore and having a closed inner end, said sensor well disposed within said bore of said body boss removable from said body boss from outside said flow meter body while said sensor well remains attached to said flow meter body; and
- a radio frequency detecting sensor disposed within said sensor well and having an inner end disposed in close proximity to said rotor.

24. The fluid flow meter of claim 23 wherein said sensor well has an outer end, and wherein said sensor has an outer end which overlaps said outer end of said sensor well so that said sensor must be removed from said sensor well before said sensor well can be removed from said body boss.

25. The fluid flow meter of claim 23 wherein said body boss has a threaded bore, wherein said sensor well has a smooth bore aligned with said threaded bore, wherein said sensor assembly also includes a bolt having a threaded shaft which is disposed in said smooth bore and which is engaged in said threaded bore, wherein said sensor is threadably attached to said sensor well, and wherein said sensor has an outer end which covers said bolt.

26. The fluid flow meter of claim 23 wherein said rotor and said blades are made entirely of aluminum or stainless steel.

27. The fluid flow meter of claim 23 wherein said sensor is attached to said sensor well and is removable from said sensor well from outside said flow meter body while said sensor well is attached to said body boss thereby maintaining fluid sensor within said flow meter body.

* * * * *